United States Patent
Anantha et al.

(10) Patent No.: US 11,218,462 B2
(45) Date of Patent: Jan. 4, 2022

(54) ACCESS NETWORK AUTHENTICATION TOKEN BROKER (ANATB) GATEWAY

(71) Applicant: Cisco Technology, Inc., San Jose, CA (US)

(72) Inventors: Swaminathan Anantha, Mountain View, CA (US); Santosh Ramrao Patil, Santa Clara, CA (US); Gangadharan Byju Pularikkal, San Jose, CA (US); Mark Grayson, Berkshire (GB); Sourav Chakraborty, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 560 days.

(21) Appl. No.: 16/178,553

(22) Filed: Nov. 1, 2018

(65) Prior Publication Data
US 2020/0145402 A1     May 7, 2020

(51) Int. Cl.
| | |
|---|---|
| H04L 29/06 | (2006.01) |
| H04W 12/06 | (2021.01) |
| H04W 88/16 | (2009.01) |
| H04W 16/14 | (2009.01) |

(52) U.S. Cl.
CPC ........ *H04L 63/0807* (2013.01); *H04L 63/061* (2013.01); *H04L 63/0892* (2013.01); *H04L 63/10* (2013.01); *H04W 12/06* (2013.01); *H04W 16/14* (2013.01); *H04W 88/16* (2013.01)

(58) Field of Classification Search
CPC ............... H04L 63/0807; H04L 63/061; H04L 63/0892; H04L 63/10; H04W 12/06; H04W 16/14; H04W 88/16; H04W 84/12
See application file for complete search history.

(56) References Cited

U.S. PATENT DOCUMENTS

| | | | |
|---|---|---|---|
| 7,607,008 B2 | 10/2009 | Howard et al. | |
| 8,495,714 B2 | 7/2013 | Jones et al. | |
| 8,819,445 B2 | 8/2014 | Schrecker | |
| 8,862,872 B2 | 10/2014 | Vanderveen et al. | |
| 9,722,972 B2 | 8/2017 | Ahmed et al. | |

(Continued)

OTHER PUBLICATIONS

Makaya et al., An Interworking Architecture for Heterogeneous IP Wireless Networks, Mar. 2007, Third International Conference on Wireless and Mobile Communications, pp. 1-6 (Year: 2007).*

*Primary Examiner* — Kenneth W Chang
(74) *Attorney, Agent, or Firm* — Patterson + Sheridan, LLP

(57) ABSTRACT

A method is performed at a gateway device including one or more processors and a non-transitory memory. The method includes, receiving, from a first wireless network, a first get authentication token request, where the first get authentication token request includes network information of a second wireless network and information of a first user equipment (UE). The method further includes forwarding the first get authentication token request to the second wireless network in response to receiving the first get authentication token request. The method additionally includes receiving a first authentication token from the second wireless network. The method also includes forwarding the first authentication token to the first UE via the first wireless network in order to associate the first UE with the second wireless network.

20 Claims, 8 Drawing Sheets

(56) References Cited

U.S. PATENT DOCUMENTS

| | | | | |
|---|---|---|---|---|
| 2005/0223217 A1* | 10/2005 | Howard | ............. | H04L 63/0884 |
| | | | | 713/155 |
| 2006/0236105 A1* | 10/2006 | Brok | .................... | H04W 12/50 |
| | | | | 713/169 |
| 2009/0119776 A1* | 5/2009 | Palnitkar | ............. | H04W 12/126 |
| | | | | 726/25 |
| 2012/0264402 A1* | 10/2012 | Zhang | ................. | H04W 12/069 |
| | | | | 455/411 |
| 2013/0047218 A1* | 2/2013 | Smith | ..................... | H04L 63/18 |
| | | | | 726/4 |
| 2013/0268766 A1* | 10/2013 | Schrecker | ........... | H04L 63/0853 |
| | | | | 713/185 |
| 2013/0301627 A1* | 11/2013 | Chen | .................... | H04W 12/08 |
| | | | | 370/338 |
| 2015/0334599 A1* | 11/2015 | Maaref | ................ | H04L 47/263 |
| | | | | 370/236 |
| 2016/0055469 A1* | 2/2016 | Kim | .................... | H04L 41/0816 |
| | | | | 705/21 |
| 2017/0230905 A1* | 8/2017 | Pularikkal | ........... | H04W 12/069 |

\* cited by examiner

ACCESS NETWORK AUTHENTICATION TOKEN BROKER (ANATB) GATEWAY

TECHNICAL FIELD

The present disclosure relates generally to wireless networks, and more particularly, to systems and methods of using an access network authentication token broker gateway for authentication of wireless networks.

BACKGROUND

Licensed radio network providers often offload cellular traffic to WiFi networks in order to ease network congestions. During the offloading, some WiFi networks are preferred by the licensed radio network providers over others. For example, for security and Quality of Service (QoS) reasons, WiFi networks that provide secure and reliable connections are more favorable than unsecured WiFi networks. In another example, certain WiFi service providers (e.g., enterprise, restaurant, café, hotel, etc.) have WiFi roaming agreements with the licensed radio network providers. Accordingly, offloading cellular traffic to WiFi networks operated by these WiFi service providers has more incentive.

Previously existing systems and methods are inadequate in authenticating WiFi service providers during cellular traffic offloading. Techniques such as EAP-SIM and/or EAP-AKA typically rely on the WiFi networks to initiate authentication requests and then redirect the authentication requests to the licensed radio networks for authentication. Using these techniques, the licensed radio network providers do not have control over when and which WiFi networks a user equipment is connected to. More importantly, in order to authenticate the requests, previously existing systems and methods often reconfigure the licensed radio networks to allow access from disparate WiFi networks. The extra configuration complicates security settings within the licensed radio networks.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
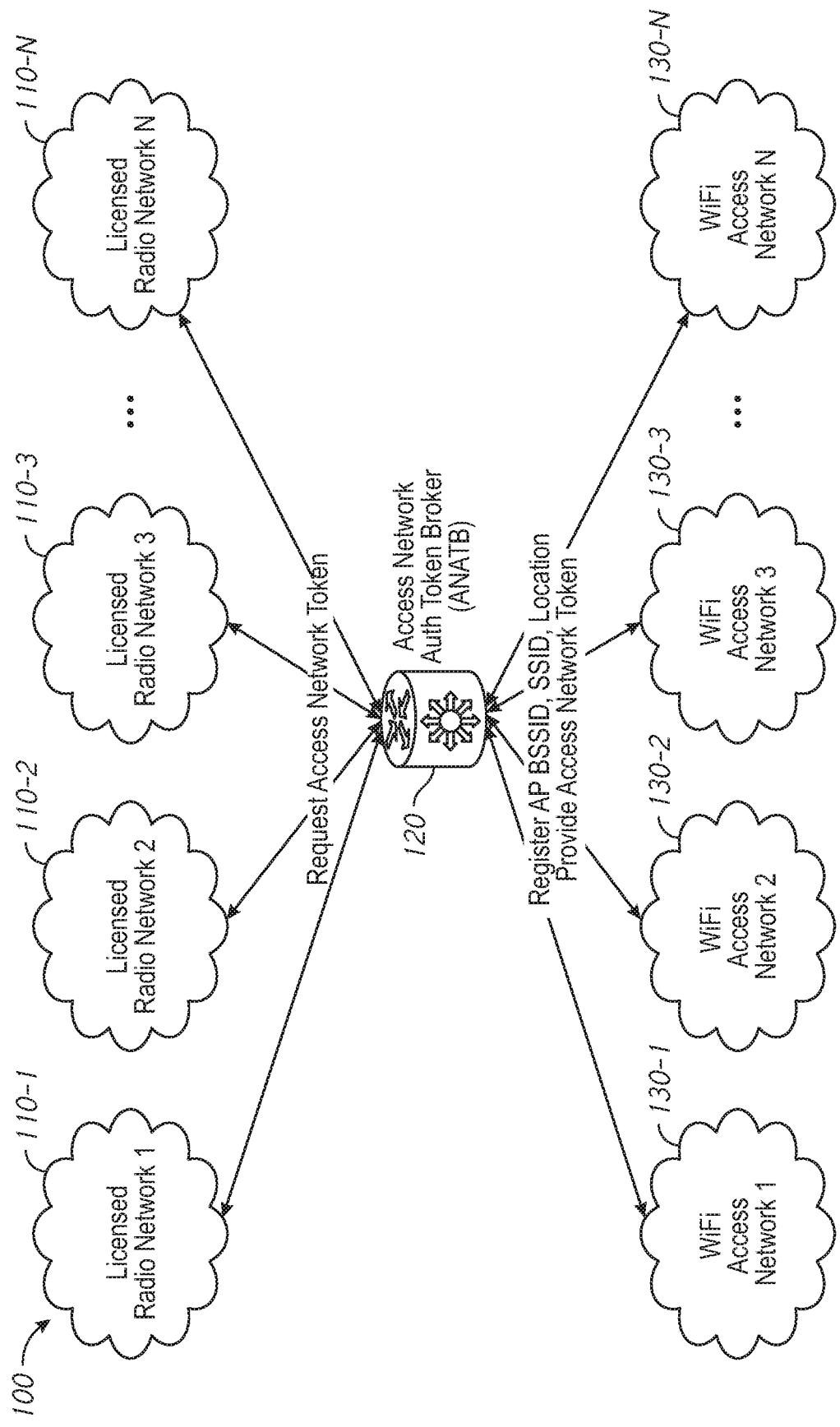
FIG. 1 is an illustration of an example of a network environment with an access network authentication token broker (ANATB) gateway in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Systems and methods described herein address the aforementioned authentication issues. In accordance with some embodiments, wireless network operators, such as licensed radio network providers (also referred to as "licensed network providers" or "licensed network operators"), use an access network authentication token broker (ANATB) gateway for authentication of wireless networks that are operated by other wireless network providers, such as WiFi network service providers (also referred to as "WiFi network providers", "WiFi service providers", or "WiFi network operators"). For instance, interested WiFi network providers register access points in their WiFi networks with the ANATB gateway. When a user equipment that is serviced by a licensed radio network enters a WiFi network, through the ANATB gateway, the licensed radio network operator requests for authentication tokens associated with the WiFi network on behalf of the user equipment. The user equipment can then use the authentication tokens to seamlessly transition to the WiFi network.

In some embodiments, a method is performed at a gateway device (e.g., the ANATB gateway) that includes one or more processors and a non-transitory memory. The method includes, receiving, from a first wireless network, a first get authentication token request, where the first get authentication token request includes network information of a second wireless network and information of a first user equipment (UE). The method further includes forwarding the first get authentication token request to the second wireless network in response to receiving the first get authentication token request. The method additionally includes receiving a first authentication token from the second wireless network. The method also includes forwarding the first authentication token to the first UE via the first wireless network in order to associate the first UE with the second wireless network.

Example Embodiments

Referring to FIG. 1, an illustration of an example of a network environment 100 with an access network authentication token broker (ANATB) gateway 120 in accordance with some embodiments. The network environment 100 in accordance with some embodiments includes a plurality of licensed radio networks, e.g., licensed radio network 1 110-1, licensed radio network 2 110-2, licensed radio network 3 110-3, . . . , licensed radio network N 110-N (collectively referred to as licensed radio networks 110). Each of the licensed radio networks 110 is operated by a licensed radio network operator (also known as "a licensed network operator", "a mobile network operator", or "a mobile network carrier"). As used herein, a licensed radio network operator is a provider of wireless communication services. In order to provide the wireless communication services, the licensed radio network operator owns or controls access to a radio spectrum license from a regulatory or government entity. Further, in order to provide the wireless communication services, the licensed radio network operator owns or controls elements to sell and deliver services to an end user through wireless signals in licensed radio spectrum. The elements can include radio spectrum allocation, building and maintaining wireless network infrastructure including back haul infrastructure, billing, customer care, provisioning computer systems, and/or marketing, etc.

In some embodiments, the licensed radio networks 110 are connected to the ANATB gateway 120 through wired or wireless connections. Also connected the ANATB gateway 120 are a plurality of WiFi access networks, e.g., WiFi access network 1 130-1, WiFi access network 2 130-2, WiFi access network 3 130-3, . . . , WiFi access network N 130-N (collectively referred to as WiFi access networks or WiFi networks 130). In some embodiments, the WiFi access networks 130 register network information of the WiFi access networks 130 with the ANATB gateway 120, e.g., registering Basic Service Set Identifier (BSSID), Service Set Identifier (SSID), and/or locations of access points (APs) within the WiFi access networks 130.

As will be described below in detail, when redirecting a user equipment (not shown in FIG. 1) to a respective WiFi access network 130, a respective licensed radio network 110 requests a get access network authentication token (also referred to as "a get authentication token request") from the ANATB gateway 120 in accordance with some embodiments. In response to receiving the request, the ANATB gateway 120 requests the respective WiFi access network 130 to provide an authentication token (also referred to as "an auth token"). Having obtained the authentication token, the respective licensed radio network 110 redirects the user equipment to the respective WiFi access network 130 in accordance with some embodiments. The user equipment can then use the authentication token for association with the respective WiFi access network 130.

As such, relative to previously existing systems and methods, in the network environment 100, the licensed radio network operators have control over which WiFi access network 130 to offload the cellular traffic without implicating the security of the licensed radio networks 110. Moreover, because there are no additional infrastructure changes to the WiFi access networks 130, the ANATB gateway 120 allows licensed radio network operators to form flexible roaming partnerships with the WiFi access network operators.

In some embodiments, the user equipment (not shown) communicatively connectable to the licensed radio network (s) 110 and the WiFi access network(s) 130. The connections are established through multiple network interfaces of the user equipment. The network interfaces can include, but are not limited to, universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), long-term evolution (LTE), global positioning system (GPS), infrared (IR), BLUETOOTH, ZIGBEE, and/or the like. For instance, the user equipment can communicate with the licensed radio network 110 using a radio as a network interface according to LTE standard; while a wireless adapter as another network interface of the user equipment can communicate with the WiFi access network 130 according to IEEE 802.11x standard.

Figure 2:
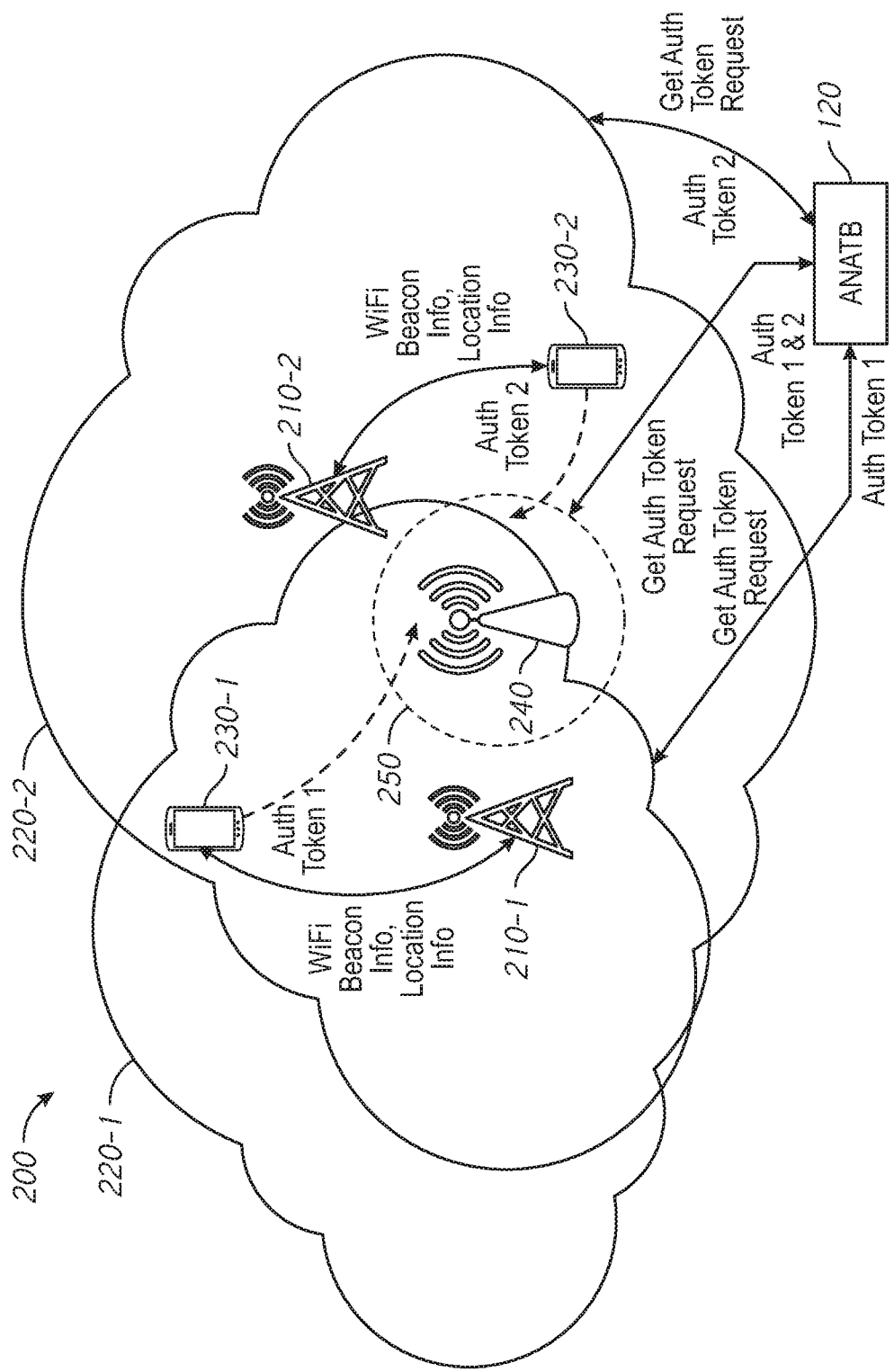
FIG. 2 is an illustration of an example of a network environment for offloading cellular traffic from multiple licensed radio networks using the ANATB gateway in accordance with some embodiments.

Turning to FIG. 2, an example of a network environment 200 for offloading cellular traffic from multiple licensed radio networks 220 using the ANATB gateway 120 in accordance with some embodiments. In the network environment 200, multiple user equipment 230 communicate with various licensed radio networks 220 via wireless connections with base stations 210. For example, a first licensed radio network operator (not shown in FIG. 2) owns and controls a first base station 210-1 that is part of a first licensed radio network 220-1. A first user equipment 230-1 initially locates within a coverage area of the first base station 210-1 and obtains services from the first licensed radio network 220-1 through wireless connections with the first base station 210-1. Likewise, a second licensed radio network operator (not shown in FIG. 2) owns and controls a second base station 210-2 that is part of a second licensed radio network 220-2. A second user equipment 230-2 initially locates within a coverage area of the second base station 210-2 and obtains services from the second licensed radio network 220-2 through wireless connections with the second base station 210-2.

In some embodiments, when a respective user equipment 230 moves proximate to a WiFi network 250 (as indicated by the dotted arrow), the user equipment 230 (e.g., the WiFi adapter of the user equipment 230) detects WiFi beacons emitted from a WiFi access point 240 of the WiFi network 250. As indicated by the solid arrows, the respective user equipment 230 then sends the WiFi beacon information and a location of the respective user equipment 230 to a respective base station 210. Through the ANATB gateway 120, the respective licensed radio network 220, which the respective base station 210 is part of, requests a respective get access network authentication token and obtains a respective authentication token from the WiFi network 250. The respective licensed radio network 220 then forwards the respective authentication token to the respective user equipment 230 through the respective base station 210. The respective user equipment 230 can then use the respective authentication token to access the WiFi network 250. For example, in FIG. 2, the first user equipment 230-1 uses the first authentication token to associate with the WiFi network 250 and the second user equipment 230-2 uses the second authentication token to associate with the WiFi network 250.

Figure 3:
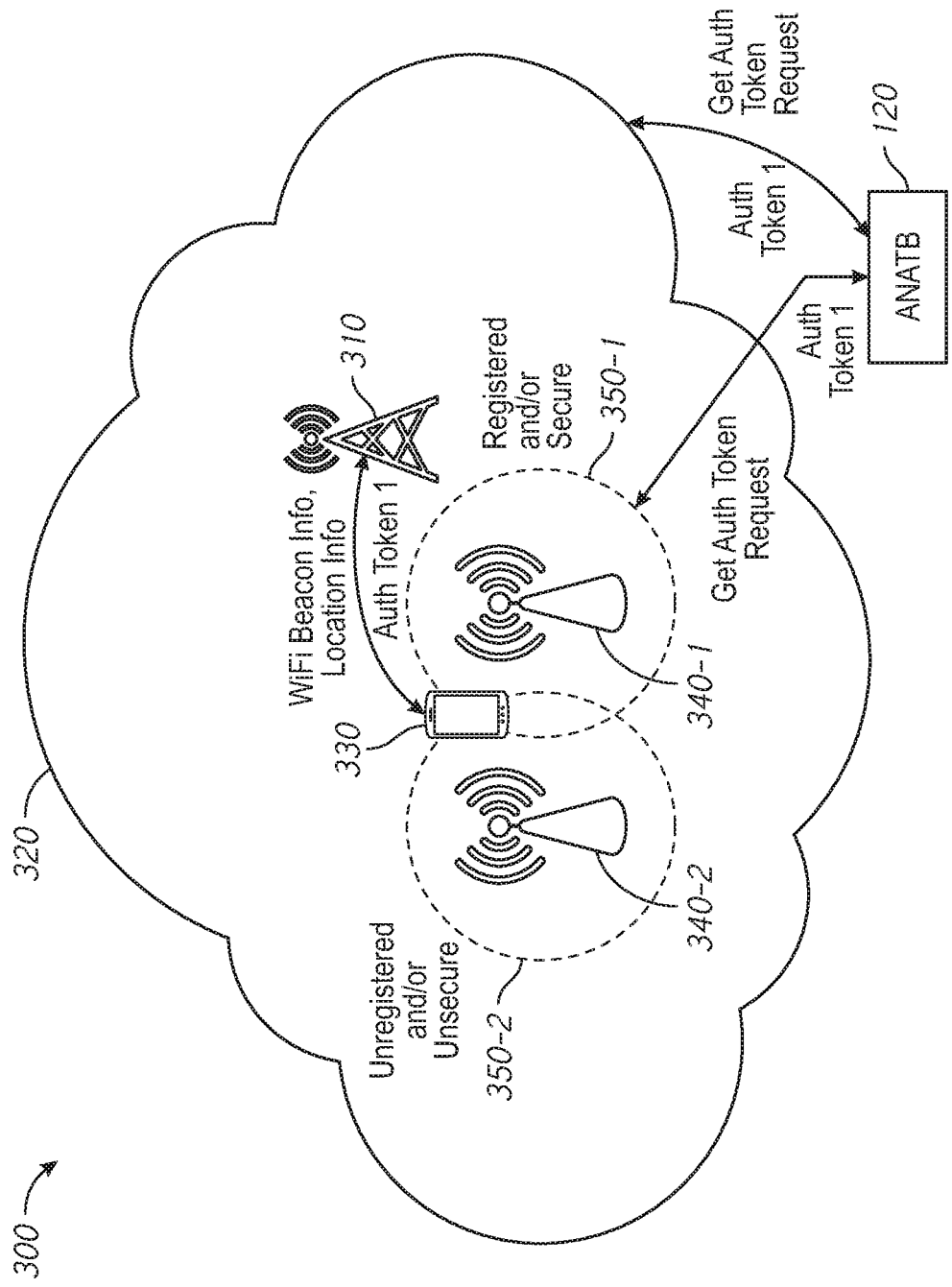
FIG. 3 is an illustration of an example of a network environment for offloading cellular traffic to a registered and/or secure WiFi network using the ANATB gateway in accordance with some embodiments.

Turning to FIG. 3, an example of a network environment 300 for offloading cellular traffic to a registered and/or secure WiFi network 350-1 using the ANATB gateway 120 in accordance with some embodiments. In some embodiments, the network environment 300 includes not only the registered and/or secure WiFi network 350-1, but also unregistered and/or unsecure WiFi network 350-2. As explained above with reference to FIG. 2, when a user equipment 330 is located with a coverage area of the base station 310, the user equipment 330 can obtain services from a licensed radio network 320, which the base station 310 is part of. When the user equipment 330 moves proximate to both the secured and/or registered WiFi network 350 and the unregistered and/or unsecure WiFi network 350-2, the user equipment 330 (e.g., the WiFi adapter of the user equipment 330) detects WiFi beacons emitted from both a WiFi access point 340-1 of the WiFi network 350-1 and a WiFi access point 340-2 of the WiFi network 350-2.

As indicated by the solid arrows, the user equipment 330 sends the WiFi beacon information from both WiFi networks 350 and a location of the user equipment 330 to the base station 310. The licensed radio network 320, which the base station 310 is part of, requests one or more get access network authentication tokens from the ANATB gateway 120. In some embodiments, the ANATB gateway 120 forwards the request associated with the registered and/or secure WiFi network 350-1 and forgoes forwarding the request associated with the unregistered and/or unsecure WiFi network 350-2. As such, through the ANATB gateway 120, a first authentication token is obtained from the registered and/or secure WiFi network 350-1 and forwarded to the user equipment 330 through the base station 310. The user equipment 330 can then use the first authentication token to associate with the registered and/or secure WiFi network 350-1.

Figure 4:
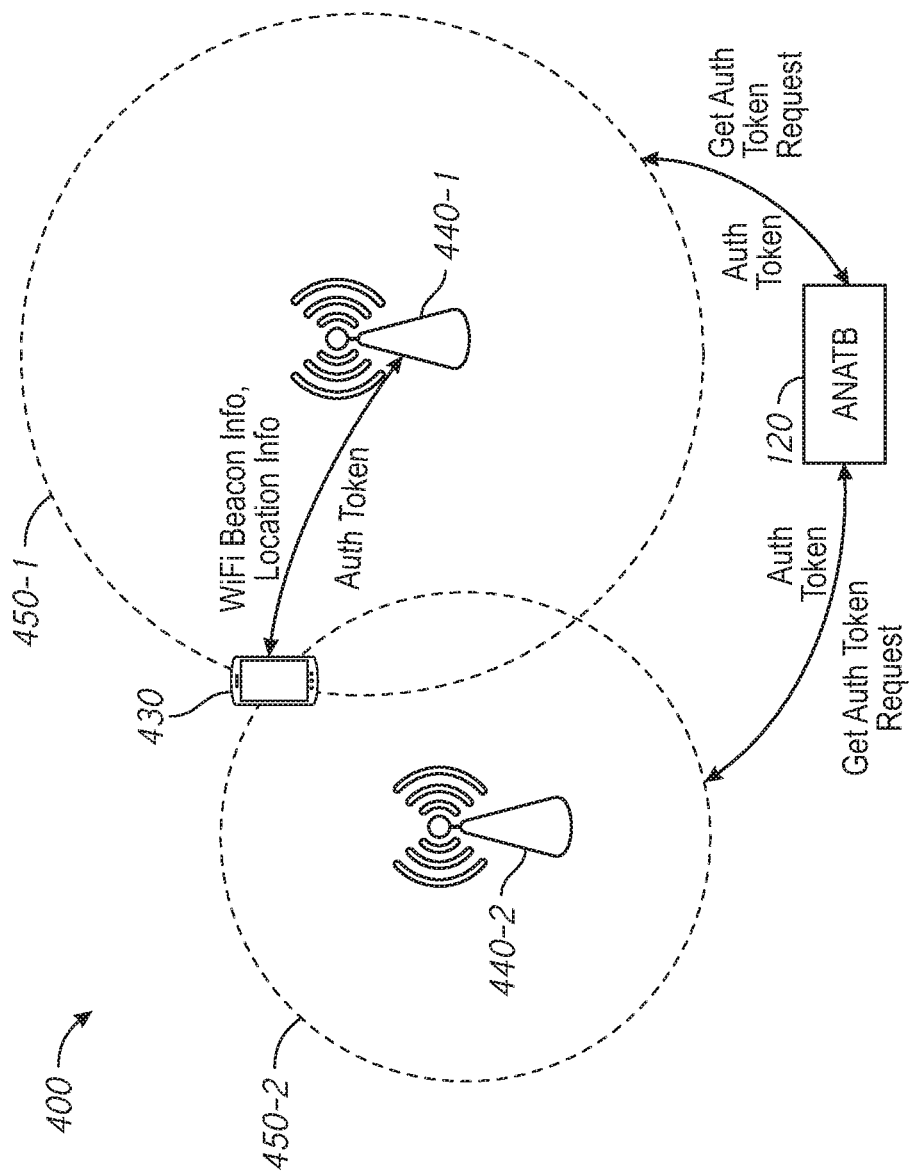
FIG. 4 is an illustration of an example of a network environment for offloading WiFi traffic from one WiFi network to another using the ANATB gateway in accordance with some embodiments.

It should be noted that the use of ANATB gateway 120 for authentication is not limited to offloading cellular traffic. Turning to FIG. 4, an example of a network environment 400 for offloading WiFi traffic from a first WiFi network 450-1 to a second WiFi network 450-2 using the ANATB gateway 120 in accordance with some embodiments. In some embodiments, a user equipment 430 initially obtains services from the first WiFi network 450-1 through communications with a first WiFi access point 440-1 of the first WiFi network 450-1. When the user equipment 430 moves proximate to the second WiFi network 450-2, the user equipment 430 (e.g., the WiFi adapter of the user equipment 430) detects WiFi beacons emitted from a second WiFi access point 440-2 of the second WiFi network 450-2.

As indicated by the solid arrows, the user equipment 430 then sends the WiFi beacon information from the second WiFi network 450-2 and a location of the user equipment 430 to the first WiFi access point 440-1. The first WiFi network 450-1 requests a get access network authentication token from the ANATB gateway 120. In some embodiments, the ANATB gateway 120 forwards the request and obtains from the second WiFi network 450-2 an authentication token. The authentication token is then forwarded to the user equipment 430 through the first WiFi access point 440-1. The user equipment 430 can then use the authentication token to associate with the second WiFi network 450-2.

As shown in FIGS. 2-4, using the ANATB gateway 120, operators of wireless networks (e.g., licensed radio network operators and/or WiFi network operators) have control over when to request authentication tokens for access to other networks and which WiFi network the user equipment is associated with. As such, a consortium of cable WiFi network operators (e.g., the WiFi network operators of the WiFi networks 250 (FIG. 2), 350-1 (FIG. 3), and/or 450-2 (FIG. 4)) and/or mobile network operators (e.g., the operators of the licensed radio network 210 (FIG. 2) and 310 (FIG. 3)) can use the ANATB gateway 120 to enable triple or quadruple play into each other's areas of strength. In particular, as shown in FIG. 4, WiFi network operators in different geographic areas (e.g., states, countries, and/or continents) can use the ANATB gateway 120 to enable roaming in each other's networks, which is valuable in fragmented WiFi landscapes.

Figure 5A:
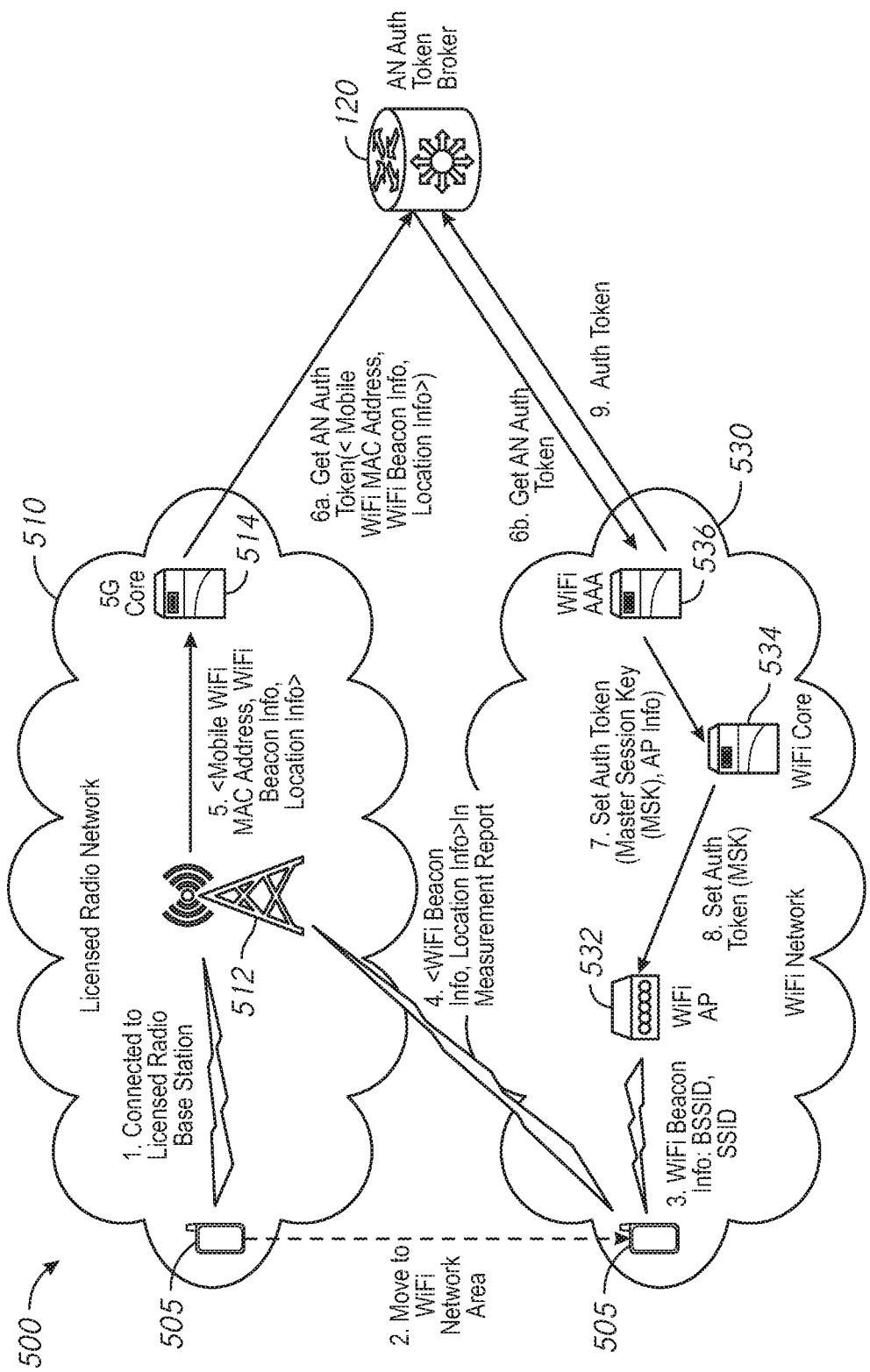
FIGS. 5A and 5B illustrate a process flow of requesting, obtaining, and using an authentication token through the ANATB gateway in accordance with some embodiments.
Figure 5B:
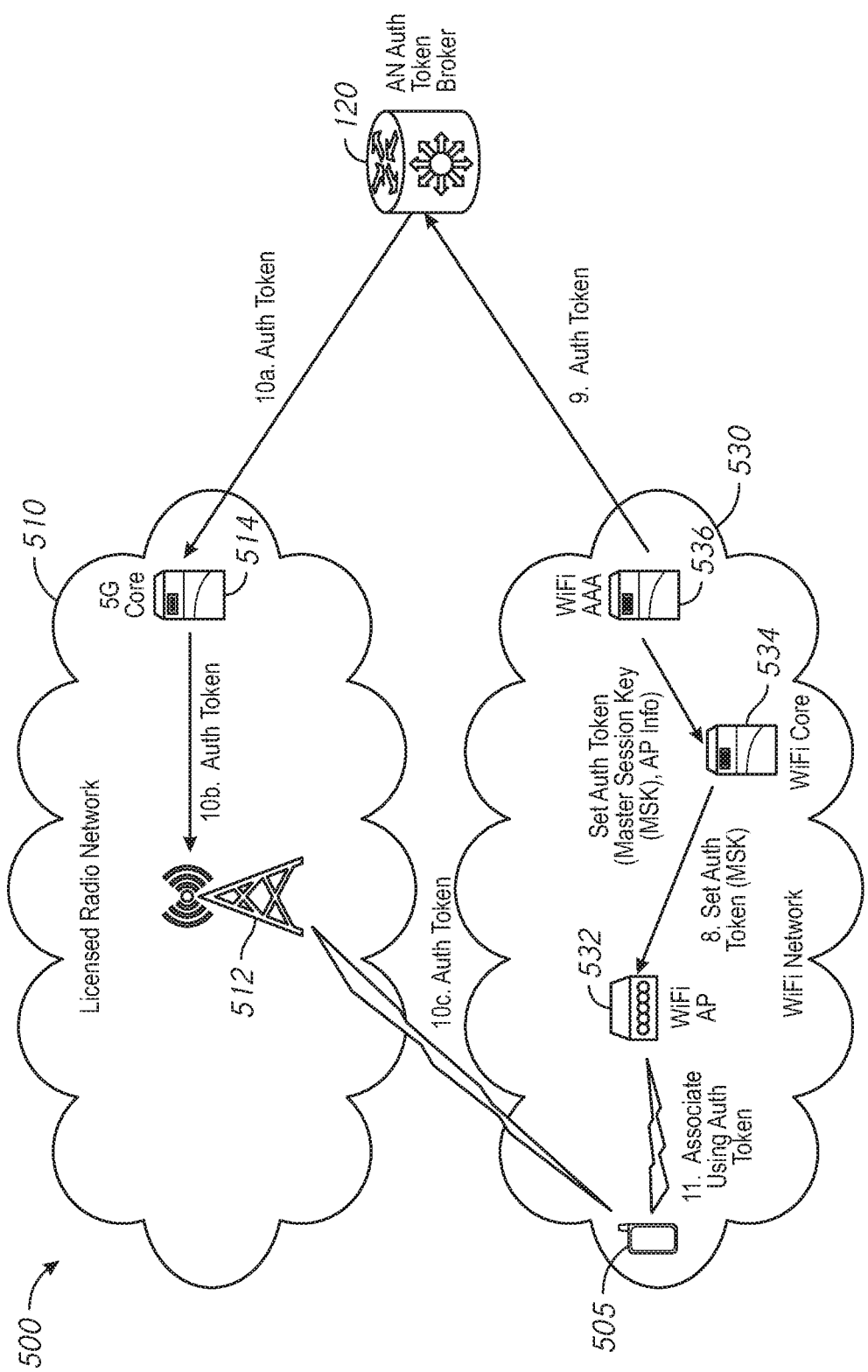

FIGS. 5A and 5B illustrate a process flow 500 of requesting, obtaining, and using an authentication token through the ANATB gateway 120 in accordance with some embodiments. In some embodiments, the process flow 500 is applied to a 5G mobile network that includes a licensed radio network 510 and a WiFi network 530 that operates in an unlicensed spectrum. It should be noted that the process flow 500 can be applied to other network environments that include various types of wireless network(s), e.g., the network environment 100 in FIG. 1 including the licensed radio networks 110 and the WiFi access networks 130, the network environment 200 in FIG. 2 including the licensed radio networks 220 and the WiFi access network 250, the network environment 300 in FIG. 3 including the licensed radio network 320 and the WiFi access networks 350, and/or the network environment 400 in FIG. 4 including the WiFi access networks 450.

Initially, a user equipment 505 is connected to the licensed radio network 510 through a base station 512 that is part of the licensed radio network 510 (step 1 of FIG. 5A). Subsequently, the user equipment 505 moves proximate to the WiFi network 530 (step 2 of FIG. 5A). In some embodiments, as the user equipment 505 moves proximate to a coverage area of a WiFi access point 532 of the WiFi network 530, the user equipment 505 listens to WiFi beacons emitted from the WiFi access point 532 and obtains information associated with the WiFi access 532 from the WiFi beacons (step 3 of FIG. 5A). In some embodiments, the information derived from the WiFi beacons include at least one of Basic Service Set Identifier (BSSID) and/or Service Set Identifier (SSID) of the WiFi access point 532.

In some embodiments, the user equipment 505 sends the information derived from the WiFi beacons along with a location of the user equipment 505 in a measurement report to the base station 512 (step 4 of FIG. 5A). The base station 512 forwards the measurement report along with a mobile WiFi MAC address of the user equipment 505 to a 5G core 514 in accordance with some embodiments (step 5 of FIG. 5A). In some embodiments, the 5G core 514 requests an authentication token from the ANATB gateway 120 (step 6a of FIG. 5A). In some embodiments, the get authentication token request is encapsulated in a GET AN Auth Token API call, and the API call further encapsulates information such as the mobile WiFi MAC address of the user equipment 505, the information derived from the WiFi beacons, and the current location of the user equipment 505. In response to receiving the get authentication token request, the ANATB gateway 120 forwards the request to a WiFi authentication, authorization, and accounting server (AAA server) 536 of the WiFi network 530 (step 6b of FIG. 5A).

In some embodiments, the WiFi AAA server 536 generates an authentication token and sends a message to a WiFi Core 534 of the WiFi network 530 to set a Master Session Key (MSK) of the authentication token (step 7 of FIG. 5A). The MSK of the authentication token can then be used to generate other keys used for a secure wireless connection session between the user equipment 505 and the WiFi access point 532. In some embodiments, the message to the WiFi Core 534 also includes the information associated with the WiFi access point 532, which can be derived from the get authentication token request received by the WiFi AAA server 536. Based on the information associated with the WiFi access point 532, the WiFi core 534 forward the MSK to the WiFi access point 532 (step 8 of FIG. 5A).

In some embodiments, as represented by step 9 illustrated in both FIG. 5A and FIG. 5B, the WiFi AAA server 536 also sends a copy of the authentication token to the ANATB gateway 120. The process 500 continues, as represented by steps 10a-10c in FIG. 5B, in response to receiving the authentication token from the WiFi AAA server 536, in some embodiments, the ANATB gateway 120 forwards the authentication token to the user equipment 505 via the 5G core 514 and the base station 512. Once the user equipment 505 receives the authentication token, the user equipment 505 can provide the authentication token as credentials to successfully authenticate itself with the WiFi network 530 and associate with the WiFi access point 532 of the WiFi network 530 (step 11 of FIG. 5B).

Figure 6:
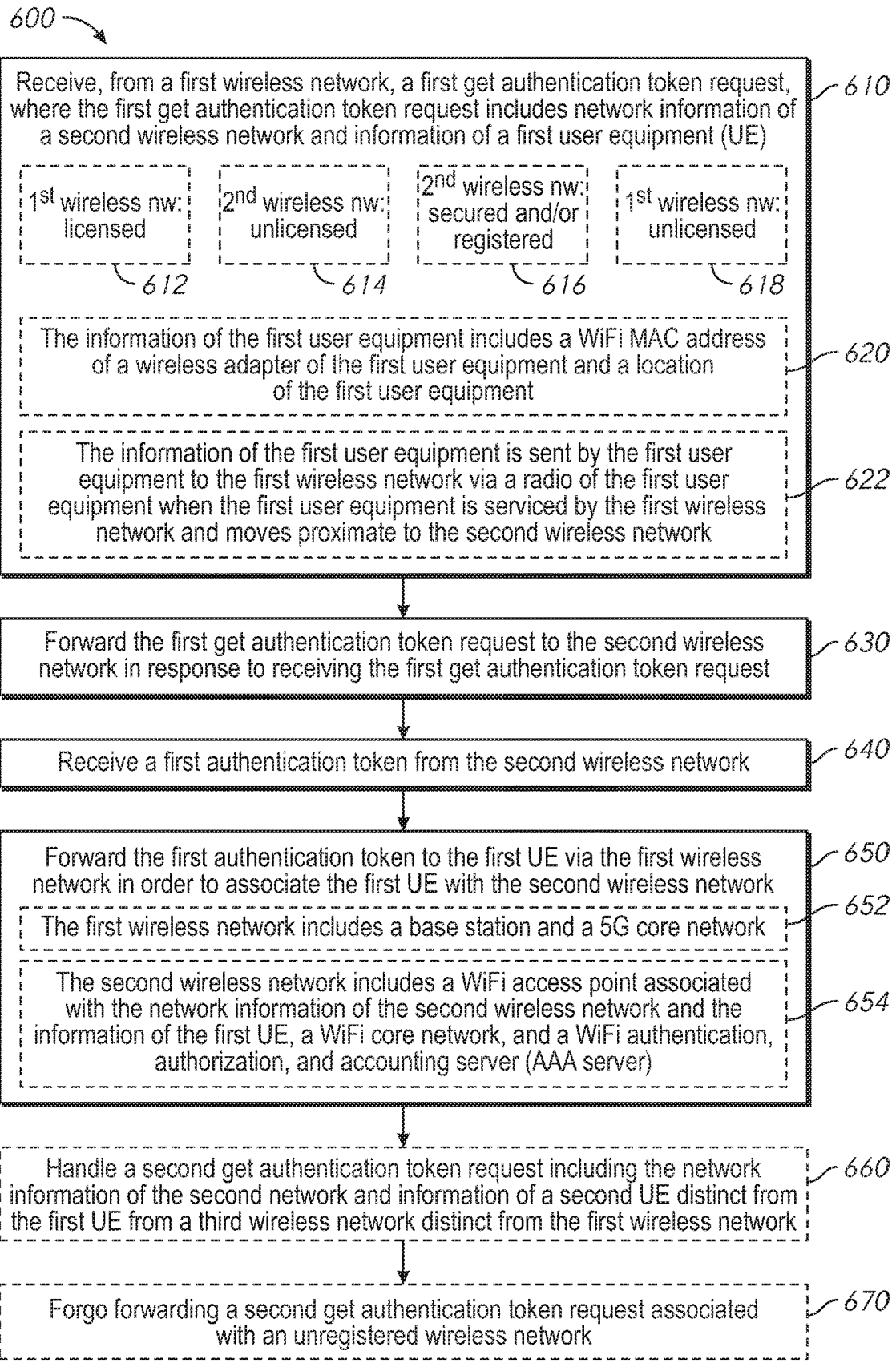
FIG. 6 is a flowchart illustrating a method of using the ANATB gateway for authentication of a wireless network in accordance with some embodiments.

FIG. 6 is a flowchart illustrating a method 600 of using an access network authentication token broker gateway for authentication of a wireless network, in accordance with some embodiments. In some embodiments, the method 600 is performed at a gateway device (e.g., ANATB gateway 120 in FIGS. 1-4 and 5A-5B) with one or more processors and a non-transitory memory.

Beginning at block 610 of FIG. 6, the gateway device receives from a first wireless network a first get authentication token request, where the first get authentication token request includes network information of a second wireless network (e.g., hotel, enterprise, café etc.) and information of a first user equipment (UE). In some embodiments, as represented by block 612, the first wireless network is a licensed radio network, e.g., the licensed radio network 110 (FIG. 1), 220 (FIG. 2), 320 (FIG. 3), or 510 (FIGS. 5A and 5B). In some embodiments, as represented by block 614, the second wireless network operates in unlicensed spectrum (e.g., the WiFi network 130 (FIG. 1), 250 (FIG. 2), 350-1 (FIG. 3), 450-2 (FIG. 4), or 530 (FIGS. 5A and 5B)). In some embodiments, as represented by block 616, the second wireless network is a secure network and/or has registered with the gateway device (e.g., the WiFi network 130 (FIG. 1) or 350-1 (FIG. 3)). Upon receiving registration of the second wireless network, in some embodiments, the gateway device stores the network information of the second wireless network for authentication of the second wireless network. For example, as shown in FIG. 1, interested WiFi network operators register access points within their WiFi access networks 130 with the ANATB gateway 120.

The method 600 is not limited to offloading cellular traffic. In some embodiments, as represented by block 618, the first wireless network operates in an unlicensed spectrum. For instance, as shown in FIG. 4, the first wireless network can be the first WiFi network 450-1. As such, in fragmented WiFi landscapes, WiFi network operators in different geographic areas (e.g., states, countries, and/or continents) can use the ANATB gateway 120 to enable roaming in each other's WiFi networks 450. Thus, a consortium of WiFi operators and/or licensed radio network operators can use the ANATB gateway 120 to enable triple or quad play into each other's areas of strength.

In some embodiments, as represented by block 620, the information of the first user equipment includes a WiFi MAC address of a wireless adapter of the first user equipment and a location of the first user equipment. In some embodiments, as represented by block 622, the information of the first user equipment is sent by the first user equipment via a radio of the first user equipment when the first user equipment is serviced by the first wireless network and moves proximate to the second wireless network. In some embodiments, the network information of the second wireless network is derived from WiFi beacons emitted from a wireless access point of the second wireless network and detected by the first UE; and the WiFi beacons include a BSSID and a SSID of the wireless access point. The method 600 continues, as represented by block 630, with the gateway device forwarding the first get authentication token request to the second wireless network in response to receiving the first get authentication token request.

For example, as shown in FIG. 5A, when the user equipment 505 being serviced by the licensed radio network 510 moves proximate to the WiFi network 530, WiFi beacon information such as the BSSID and the SSID of the WiFi access point 532 are detected by the wireless adapter of the first user equipment 505. The WiFi beacon information and the WiFi MAC address and the location of the first user equipment are sent to the base station 512 of the licensed radio network 510. Using the WiFi MAC address and the location of the first user equipment and the network information of the WiFi network 530, the ANATB gateway 120 forwards the get authentication token request to the WiFi AAA server in the appropriate WiFi network 530. The ANATB gateway 120 then receives such information from the licensed radio network 510 included in the get access network authentication token request and forwards the get access network authentication token request to the appropriate WiFi network 530.

Still referring to FIG. 6, the method 600 further includes receiving an authentication token from the second wireless network, as represented by block 640, and forwarding the authentication token to the first UE via the first wireless network in order to associate the first UE with the second wireless network, as represented by block 650. In some embodiments, as represented by block 652, the first wireless network includes a base station and a 5G core network. In such embodiments, as shown in FIG. 5A for example, the base station 512 services the user equipment 505 and receives the network information of the WiFi network 530 and the information of the user equipment 505 from the user equipment 505 via the radio of the user equipment 505. Further, the base station 512 forwards the network information of the WiFi network 530 and the information of the user equipment 505 to the 5G core network 514. In response to receiving the network information of the WiFi network 530 and the information of the user equipment 505, the 5G core network 514 generates the get authentication token request (e.g., the Get AN Auth Token API call in step 6a of FIG. 5A) and forwards the get authentication token request to the ANATB gateway 120. Also, as shown in FIG. 5A, upon receiving the authentication token, the ANATB gateway 120 forwards the authentication token to the user equipment 505 via the 5G core network 514, the base station 512, and the radio of the user equipment 505.

Referring back to FIG. 6, in some embodiments, the second wireless network includes a WiFi access point (e.g., the WiFi access point 532 in FIGS. 5A and 5B) associated with the network information of the second wireless network and the information of the first UE, a WiFi core network (e.g., the WiFi core network 534 in FIGS. 5A and 5B), and a WiFi authentication, authorization, and accounting server (AAA server) (e.g., the WiFi AAA server 536 in FIGS. 5A and 5B). In such embodiments, the WiFi AAA server generates the authentication token and sends a message to the WiFi core network, where the message includes the authentication token and at least a portion of the network information of the second wireless network. Further in such embodiments, in response to receiving the message, the WiFi core network generates a master session key for the authentication token and sends the master session key for the authentication token to the WiFi access point.

In some embodiments, as represented by block 660, the method 600 further includes handling a second get authentication token request from a third wireless network distinct from the first wireless network. For instance, as shown in FIG. 2, in addition to receiving the get authentication token request from the first licensed radio network 220-1, the ANATB gateway 120 also receives the get authentication token request from the second licensed radio network 220-2. As shown in FIG. 2, when the second UE 230-2 serviced by the second licensed radio network 220-2 moves proximate to the WiFi network 250, a radio of the second UE 230-2 transmits the network information of the second licensed radio network 220-2 and the information of the second UE 230-2 to the second base station 210-2 of the second licensed radio network 220-2. The second licensed radio network 220-2 then sends the get authentication token request including the network information of the second wireless network 220-2 and the information of the second UE 230-2 to the ANATB gateway 120. The ANATB gateway 120 then forwards the get authentication token request to the second wireless network, receives an authentication token from the second wireless network, and forwards the authentication token to the second UE 230-2 via the second licensed radio network 220-2 in order to associate the second UE 230-2 with the WiFi wireless network 250.

In some embodiments, the gateway device receives a second get authentication token request, where the second get authentication token request includes network information of a wireless network that has not registered with the gateway device. In such embodiments, as represented by block 670, the method 600 further includes, in response to receiving the second get authentication token request, forgoing forwarding the second get authentication token request. For example, as shown in FIG. 3, the UE 330 moves proximate to two WiFi networks 350-1 and 350-2. In case the WiFi network 350-1 has registered with the ANATB gateway 120, the ANATB gateway 120 would forward the get authentication token request from the licensed radio network 320 to the WiFi network 350-1, so that the UE 330 can associate with the WiFi network 350-1 for network access. In contrast, in case the WiFi network 350-1 has not registered with the ANATB gateway 120, the ANATB gateway 120 would not forward the get authentication token request from the licensed radio network 320 to the WiFi network 350-2. Accordingly, the UE 330 would be associated with the WiFi network 350-1 using the authentication token for security, QoS, and/or business incentive reasons.

Figure 7:
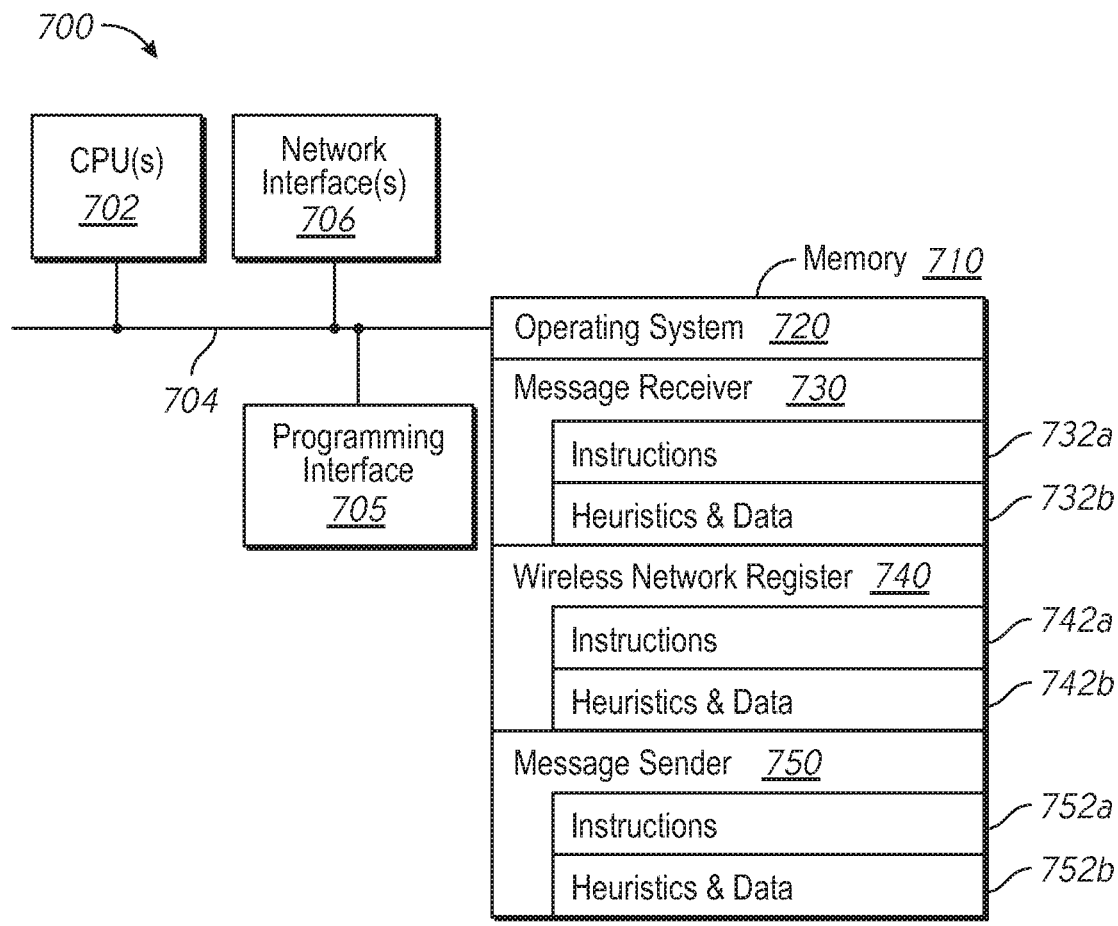
FIG. 7 is a block diagram of a computing device in accordance with some embodiments.

FIG. 7 is a block diagram of a computing device 700 in accordance with some embodiments. In some embodiments, the computing device 700 provides gateway functions described above, e.g., the ANATB gateway 110 in FIGS. 1-4 and 5A-5B. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more network interfaces 706, a memory 710, a programming interface 705, and one or more communication buses 704 for interconnecting these and various other components.

In some embodiments, the communication buses 704 include circuitry that interconnects and controls communications between system components. The memory 710 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 710 optionally includes one or more storage devices remotely located from the one or more CPUs 702. The memory 710 comprises a non-transitory computer readable storage medium. Moreover, in some embodiments, the memory 710 or the non-transitory computer readable storage medium of the memory 710 stores the following programs, modules and data structures, or a subset thereof including an optional operating system 720, a message receiver 730, a wireless network register 740, and a message sender 750. In some embodiments, one or more instructions are included in a combination of logic and non-transitory memory. The operating system 720 includes procedures for handling various basic system services and for performing hardware dependent tasks.

In some embodiments, the message receiver 730 is configured to receive a message, e.g., get access network authentication token requests, authentication tokens, and/or messages associated with wireless network registration. To that end, the message receiver 730 includes a set of instructions 732a and heuristics and data 732b.

In some embodiments, the wireless network register 740 is configured to facilitate registration of wireless networks and/or store information of the registered wireless networks. To that end, the wireless network register 740 includes a set of instructions 742a and heuristics and data 742b.

In some embodiments, the message sender 750 is configured to send messages, e.g., e.g., get access network authentication token requests and/or authentication tokens. To that end, the message sender 750 includes a set of instructions 752a and heuristics and data 752b.

Although the message receiver 730, the wireless network register 740, and the message sender 750 are illustrated as residing on a single computing device 700, it should be understood that in other embodiments, any combination of the message receiver 730, the wireless network register 740, and the message sender 750 are illustrated as residing on the single computing device 700 can reside in separate computing devices in various embodiments. For example, in some embodiments, each of the message receiver 730, the wireless network register 740, and the message sender 750 are illustrated as residing on a single computing device 700 resides on a separate computing device.

Moreover, FIG. 7 is intended more as a functional description of the various features that are present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first", "second", etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
   at a gateway device including one or more processors and a non-transitory memory:
   receiving, from a first wireless network, a first get authentication token request, wherein the first get authentication token request includes network information of a second wireless network and information of a first user equipment (UE);
   forwarding the first get authentication token request to the second wireless network in response to receiving the first get authentication token request;
   receiving a first authentication token from the second wireless network;
   forwarding the first authentication token to the first UE via the first wireless network in order to associate the first UE with the second wireless network;
   receiving a second get authentication token request including network information of a third wireless network that has not registered with the gateway device; and
   in response to receiving the second get authentication token request, determining that the second get authentication token request should not be forwarded.

2. The method of claim 1, wherein the first wireless network is a licensed radio network.

3. The method of claim 1, wherein the second wireless network operates in an unlicensed spectrum.

4. The method of claim 1, wherein the second wireless network is a secure network.

5. The method of claim 1, furthering comprising:
   receiving a registration of the second wireless network; and
   storing the network information of the second wireless network.

6. The method of claim 1, wherein the first wireless network operates in an unlicensed spectrum.

7. The method of claim 1, wherein the information of the first UE includes a WiFi media access control (MAC) address of a wireless adapter of the first UE and a location of the first UE.

8. The method of claim 1, wherein the information of the first UE is sent by the first UE to the first wireless network via a radio of the first UE when the first UE is serviced by the first wireless network and moves proximate to the second wireless network.

9. The method of claim 1, wherein:
   the network information of the second wireless network is derived from WiFi beacons emitted from a wireless access point of the second wireless network and detected by the first UE; and
   the WiFi beacons include a basic service set identifier (BSSID) and a service set identifier (SSID) of the wireless access point.

10. The method of claim 1, wherein the first wireless network includes a base station and a 5G core network.

11. The method of claim 10, wherein:
    the base station services the first UE and receives the network information of the second wireless network and the information of the first UE from the first UE; and
    the base station forwards the network information of the second wireless network and the information of the first UE to the 5G core network.

12. The method of claim 11, wherein the 5G core network generates the first get authentication token request in response to receiving the network information of the second wireless network and the information of the first UE.

13. The method of claim 10, wherein the first authentication token is forwarded to the first UE via the 5G core network and the base station.

14. The method of claim 1, wherein the second wireless network includes a WiFi access point associated with the network information of the second wireless network and the information of the first UE, a WiFi core network, and a WiFi authentication, authorization, and accounting (AAA) server.

15. The method of claim 14, wherein the WiFi AAA server generates the first authentication token and sends a message to the WiFi core network, the message includes the first authentication token and at least a portion of the network information of the second wireless network.

16. The method of claim 15, wherein in response to receiving the message, the WiFi core network generates a master session key for the first authentication token and sends the master session key for the first authentication token to the WiFi access point.

17. The method of claim 1, further comprising:
receiving, from a third wireless network distinct from the first wireless network, a second get authentication token request, wherein:
  the second get authentication token request includes the network information of the second wireless network and information of a second UE distinct from the first UE, and
  the information of the second UE is sent by the second UE via a radio of the second UE when the second UE is serviced by a third wireless network and moves proximate to the second wireless network;
forwarding the second get authentication token request to the second wireless network in response to receiving the second authentication token request;
receiving a second authentication token from the second wireless network; and
forwarding the second authentication token to the second UE via the third wireless network in order to associate the second UE with the second wireless network.

18. A computing device comprising:
one or more processors;
a non-transitory memory; and
one or more programs stored in the non-transitory memory, which, when executed by the one or more processors, cause the computing device to:
  receive, from a first wireless network, a first get authentication token request, wherein the first get authentication token request includes network information of a second wireless network and information of a first user equipment (UE);
  forward the first get authentication token request to the second wireless network in response to receiving the first get authentication token request;
  receive a first authentication token from the second wireless network;
  forward the first authentication token to the first UE via the first wireless network in order to associate the first UE with the second wireless network;
  receive a second get authentication token request including network information of a third wireless network that has not registered with a gateway device; and
  in response to receiving the second get authentication token request, determine that the second get authentication token request should not be forwarded.

19. The computing device of claim 18, wherein the first wireless network is a licensed radio network.

20. A non-transitory computer readable storage medium storing one or more programs, the one or more programs comprising instructions, which, when executed by a computing device with a non-transitory memory and one or more processors, cause the computing device to perform or cause performance of:
  receiving, from a first wireless network, a first get authentication token request, wherein the first get authentication token request includes network information of a second wireless network and information of a first user equipment (UE);
  forwarding the first get authentication token request to the second wireless network in response to receiving the first get authentication token request;
  receiving a first authentication token from the second wireless network;
  forwarding the first authentication token to the first UE via the first wireless network in order to associate the first UE with the second wireless network;
  receiving a second get authentication token request including network information of a third wireless network that has not registered with a gateway device; and
  in response to receiving the second get authentication token request, determining that the second get authentication token request should not be forwarded.

* * * * *